Patented June 5, 1951

2,555,794

UNITED STATES PATENT OFFICE 2,555,794

WELL-DRILLING FLUID

Rudolf August Henkes, Mene Grande, Venezuela, assignor to Shell Development Company, San Francisco, Calif., a corporation of Delaware No Drawing. Application October 18, 1948,
Serial No. 55,230

4 Claims. (Cl. 252—8.5)

This invention relates to the drilling of oil and gas wells and pertains more particularly to the use and composition of an improved drilling fluid. The present application is a continuation-in-part of my application Serial No. 515,809, filed December 27, 1943 (now abandoned).

The circulation of a drilling fluid or mud through the borehole is necessary in rotary drilling in order to lubricate the drill bit, to keep the borehole clean by carrying the cuttings to the surface, to prevent blowouts by holding down high formation pressures, and to form on the walls of the borehole a sheath or cake which prevents the drilling fluid from escaping into porous formations.

Drilling fluids commonly used heretofore were water-base fluids, for example clay suspended in water, and oil-base drilling fluids, for example, calcium carbonate suspended in oil.

The chief disadvantages of water-base fluids are as follows: Their gel-forming and plastering, that is, sheath forming properties, are subject to deterioration upon contamination by salts from formation brines. In drilling through so-called heaving shale formations, the water of the the fluid causes a swelling of the shale and a collapse of the borehole walls. In drilling through oil-bearing formations, the high hydrostatic pressure of the drilling fluid column may force the water of the fluid deep into the formation, thus plugging this formation. This contaminating water is not expelled by the flow of oil back into the borehole after the well is put on production, but often remains adhering to the sand grains, thus greatly reducing the productivity of the well. In the same manner, this water contaminates the cores which it is customary to obtain during drilling, and thus makes it impossible to determine accurately the true fluid content of these cores, and of the formations from which they are obtained. Finally, the mudsheath formed by water-base fluids sometimes impedes the flow of oil from the producing formation into the well. When the oil is produced from an open or uncased hole, this can be remedied by washing or cutting the mud-sheath away. When, however, the oil is produced through a perforated or slotted casing, liner or screen, it is extremely difficult to wash the sheath away from behind the screen. Sloughing particles of the mudsheath clog the perforations of the screen during production, and greatly reduce the inflow of the oil to the well.

The chief disadvantages of the oil-base fluids are as follows: Their cost is greatly in excess of that of water-base muds. Their preparation involves considerable mixing difficulties in the field, since they require various additives, such as lampblack, soaps, blown asphalt, etc., to regulate their gel-forming and plastering properties. They furthermore have an unfavorable temperature viscosity coefficient, that is, their viscosity is usually high at well-head temperatures, which imposes a strain on the pumping equipment, and is low at high bottom hole temperatures, which permits the sediment and cuttings to settle at the bottom of the well, and makes it impossible to obtain a clean hole without extensive cleaning. Finally, the oil-base fluids, as well as the mudsheaths formed thereby, are electrically non-conductive, which makes it extremely difficult to obtain satisfactory electrical logs when using such fluids.

It is therefore the object of this invention to provide a drilling fluid which combines the good properties of the water-base and of the oil-base drilling fluids without having their disadvantages.

It has been found that such fluid can be obtained and successfully used in drilling wells by forming an emulsion of oil in water, and preferably an emulsion of a crude petroleum oil in a water-base drilling fluid.

In practicing the present invention, it is preferred to start with an ordinary water-base drilling fluid, comprising a suspension of a finely divided solid material such as clay, bentonite, etc. in water, whose viscosity may be controlled by means of chemical agents such as polyphosphoric acid salts, for example pyrophosphates, tetraphosphates, hexametaphosphates, etc. or basic solutions of substances such as tannins, lignins, ulmins, humins, etc. The specific gravity of the fluid may at the same time be controlled by adjusting the amount of the solid material suspended or dispersed therein, or by adding thereto additional finely divided weighting materials, such as calcium carbonate, barytes, galena, iron oxide, etc. Materials such as flake mica, asbestos and the like may also be added to the fluid, particularly when drilling through fractured or creviced formations to prevent excessive losses of the fluid to said formations. To this fluid there is added, according to the present invention, a mineral oil and an agent to emulsify this oil in the water-base fluid.

As a mineral oil, there may be used any petroleum or coal tar distillate oil, for example crude oil, gas oil, stove oil, Diesel oil, etc., Diesel and crude oils having a gravity in the range from 12 to 40° A. P. I. being preferred.

As emulsifying agents, commercially available emulsifiers may be used, such for example, as: alkyl and aryl sulfonates, sulfated oils, fatty acids, glyceryl and alcohols, etc., fatty acid soaps and their derivatives, polyphosphate compounds, such for example as pyrophosphates, sea moss or weed extracts such as alginates, algin soaps, etc., extracts of substances such as tannins, humins, lignins, ulmins, and more particularly substances or their extracts such as quebracho, agar, divi-divi, gum tragacanth, etc., used with caustic or basic-reacting agents, or any suitable mixture of the above-recited compounds.

The amounts in which these emulsifiers are added depend on the character of the mud, the properties desired of the emulsion, and the type of emulsifier used. Normally, an amount of from 0.1 to 2.0 per cent on the weight of the water-base fluid should be used.

It has, however, been found that especially good results are obtained by using as emulsifier an alkali soap of a highly unsaturated fatty acid, that is, of a fatty acid having two or more double bonds per molecule, such for example as linolic, linolenic and similar acids which are obtainable from substances such as linseed oil, soya bean oil and similar oils.

In forming the above soaps, it is preferred, according to the present invention, to use tall oil as starting material.

Tall oil, which is obtained by digestion of wood, may be used either in crude or refined form, and has been found particularly effective as comprising in its composition, besides unsaponifiable material, approximately 30 per cent of doubly unsaturated fatty acids and approximately 40 per cent of rosin acids, which together produce particularly favorable results when used in forming the present drilling emulsions.

In practicing this invention, a desired source of doubly unsaturated fatty acids, preferably having at least 10 carbon atoms per molecule, such particularly as tall oil, is reacted with a basic material such as an alkali hydroxide, for example, sodium or potassium hydroxides, to produce the desired alkali metal soaps.

As an example, to one barrel (42 gallons) of Diesel fuel oil there is added, with agitation, approximately 0.7 gallon of an aqueous solution of sodium hydroxide of about 40° Bé. gravity, which is equivalent to about 2.75 lbs. of solid caustic soda. After these components have become thoroughly mixed, approximately 3 gallons of tall oil are slowly added with further agitation to the mixture and reacted with the sodium hydroxide therein to give approximately 45.5 gallons of emulsifiable oil base having a density of about 7¼ lbs. per gallon and containing the requisite amount of emulsifier soap. The amounts of the caustic alkali and of tall oil mentioned above may be varied within proper limits so as to maintain the pH of the mixture preferably between the values of 10 and 10.5.

This emulsifiable oil base may then be added to any suitable water base drilling fluid and emulsified therewith by means of jet guns, mud hoppers, etc.

It has also been found that further improved results may be obtained in forming the emulsifier soaps of the present invention by substituting a relatively mild basic substance, such particularly as sodium silicate, for at least a portion of the strong caustic alkali used for this purpose and by subsequently using said sodium silicate as a treating agent continuously applied for maintaining the drilling emulsion in proper condition during the drilling process. While it appears desirable to react at least a small amount of a strong base, such as sodium hydroxide, with tall oil or other suitable substance to form the original emulsifier soap within the emulsifiable oil base, as described above, improved results are obtainable by thereafter substituting sodium silicate for sodium hydroxide. Sodium silicate, being a much milder base than sodium hydroxide, is less critical as to the amounts used, and therefore permits a much readier and more accurate control of the properties desired in the emulsion or emulsifiable base, whose pH, as already stated, requires adjustment to a value within the relatively very narrow range between 10 and 10.5. In a similar way, the viscosity of an emulsion may be maintained at the desired exact value by the addition of a weak base, preferably sodium silicate, to raise said viscosity, or by the addition of a source of fatty acids, preferably tall oil, to lower said viscosity. Although it is not desired to advance any definite theory in this regard, it is believed that, besides greatly facilitating the control of the viscosity of the emulsion, the use of sodium silicate as a basic reacting agent has the advantage of improving the fluid-impervious properties of the sheath formed by the emulsion through the additional formation of certain silicic compounds.

When using sodium silicate to form the emulsifiable oil base of the present invention, the following procedure may be followed as an example.

To a barrel, or 42 gallons, of a Diesel oil there is added, with agitation and while maintaining the ingredients being mixed at a temperature not less than 100° F., approximately 1 lb. of caustic soda dissolved in half a gallon of water. There is thereafter added, likewise with agitation, 1¼ gallons of a sodium silicate solution of approximately 40° Bé., having preferably a silica to alkali ratio of about 3 to 1 and containing between 5 and 5¼ lbs. of sodium silicate. Finally, about 18 lbs. or 2¼ gallons of tall oil are slowly added with agitation to form the emulsifiable oil base. This base can then be emulsified in any suitable available water base drilling fluid, and the properties of the emulsion controlled in the manner described hereinabove.

If desired, some sodium chloride may be added to the emulsifiable base in accordance with the teachings of U. S. Letters Patent No. 2,430,039, and some blown asphalt may be added thereto in accordance with the teachings of U. S. Letters Patent No. 2,223,027.

The proportions in which the oil is mixed with the water-base fluid depend on the particular properties desired from the resulting emulsion, and on the specific gravities of the water-base fluid and of the oil. In general, these proportions vary from 15 per cent oil and 85 per cent water-base fluid to 50 per cent oil and 50 per cent water-base fluid, all percentages being by volume. For example, a drilling emulsion comprising 25 per cent of crude oil and 75 per cent of an aqueous clay mud weighing 85 lbs. per cubic foot, gives a drilling emulsion weighing about 79 lbs. per cubic foot. If the amount of crude oil is raised to 50 per cent, a drilling emulsion weighing about 72 lbs. per cubic foot is obtained.

By comparison with ordinary clay-water drilling fluids, the present drilling emulsions give a relatively high viscosity reading with the Marsh Funnel or the Stormer Viscometer, and a disproportionately low reading with the McMichael Viscometer. It may be noted that the same anomaly is observed with ordinary oil-base muds.

and is probably due to the lubricating effects of the oil, which make the present drilling emulsion highly suitable for actual use in wells, even in cases where the measured viscosity appears to be excessively high. A viscosity of from 55 to 80 seconds A. P. I. is in general most suitable for the present emulsions.

The viscosity temperature coefficient of the present drilling emulsions is very good as compared with that of ordinary oil-base muds, that is, the viscosity of the present emulsions is not affected or reduced as greatly as that of the oil-base muds by the high temperatures prevailing deep underground.

The plastering properties of the present emulsions are very good, and remain so at high temperatures and pressures, the mudsheath formed thereby being extremely thin and substantially impervious to fluid loss. Due to the oily nature of said sheath and possibly to the silicic compounds formed as explained above, it is especially impervious to water flow. Therefore, although the present emulsions have water as the continuous or external phase, and oil as the discontinuous phase, the water of the emulsion has substantially no effect on the heaving shale layers traversed by the well. These excellent plastering properties are shown in the following example which relates to three emulsions formed with the same water-base drilling fluid comprising California clay and bentonite, weighted to 90 lbs. per cubic foot and conditioned with sodium pyrophosphate and quebracho. An A. P. I. plastering test on this water-base fluid gives a water loss of 22 cc. in 30 min. and a cake thickness of ¼ inch.

Three different emulsions were formed by using 80% of this water base drilling fluid and 20% of an emulsifiable base. Emulsions #1 and #2 were formed with the reagents and in the manner described hereinabove, while emulsion #3 was formed with an emulsifier soap comprising oleic acid instead of tall oil. The results of A. P. I. plastering tests on these emulsions are tabulated hereinbelow:

| Emulsifiable Base | Cake Thickness | Water Loss |
|---|---|---|
| | Inches | Cc. |
| Emulsion No. 1: | | |
| Diesel Oil—92% | | |
| NaOH solution—2% | 1/16 | 3 |
| Tall Oil—6% | | |
| Emulsion No. 2: | | |
| Diesel Oil—91% | | |
| NaOH solution—1% | | |
| Na$_2$SiO$_3$ solution—3% | 1/16 | 2 |
| Tall Oil—5% | | |
| Emulsion No. 3: | | |
| Diesel Oil—94% | | |
| NaOH solution—2% | 3/16 | 12 |
| Oleic acid—4% | | |

The electrical resisitivity of the present drilling emulsions varies with the particular compositions used, but in general has an average value of about 200 ohms m./m.$^2$. Excellent electrical logs may therefore be obtained in the wells drilled with or containing said emulsions, without having recourse to special type electrodes normally used for oil-base mud wells.

I claim as my invention:

1. A drilling emulsion for oil and gas wells, comprising approximately from 85 to 50 per cent of an aqueous fluid forming the external phase of the emulsion, from 15 to 50 per cent of a mineral oil forming the internal phase of the emulsion, a finely divided solid material dispersed in the emulsion, and an emulsifying agent for the emulsion, said emulsifying agent comprising approximately from 4 to 8 per cent of tall oil, and an amount of a basic reacting substance equivalent in neutralizing power to approximately from 2 to 4 per cent of a 40 Bé. aqueous solution of sodium hydroxide, said basic reacting substance being capable of forming a water-soluble soap with tall oil, the above percentage of tall oil and of the basic reacting substance having reference to the volume of the mineral oil.

2. The composition of claim 1, wherein the basic reacting substance is sodium silicate.

3. The composition of claim 1, wherein the basic reacting substance is a mixture of sodium hydroxide and sodium silicate.

4. A drilling emulsion for oil and gas wells comprising approximately from 85 to 50 percent of an aqueous fluid forming the external phase of the emulsion, from 15 to 50 per cent of a mineral oil forming the internal phase of the emulsion, a finely divided solid material dispersed in the emulsion, and an emulsifying agent for the emulsion, said emusifying agent comprising approximately 4 to 8 per cent of tall oil on the volume of said mineral oil, and a quantity of a basic reacting substance required to maintain the pH of the emulsion at a value between 10 and 10.5, said basic reacting substance being capable of forming a water-soluble soap with tall oil.

RUDOLF AUGUST HENKES.

REFERENCES CITED

The following references are of record in the file of this patent:

UNITED STATES PATENTS

| Number | Name | Date |
|---|---|---|
| 1,992,949 | Hodges | Mar. 5, 1935 |
| 2,107,287 | Curran | Feb. 8, 1938 |
| 2,297,660 | Mazee | Sept. 29, 1942 |
| 2,350,154 | Dawson et al. | May 30, 1944 |
| 2,380,156 | Dobson et al. | July 10, 1945 |
| 2,430,039 | Anderson | Nov. 4, 1947 |
| 2,461,483 | Self | Feb. 8, 1949 |
| 2,488,304 | Malott | Nov. 15, 1949 |